United States Patent

Sarpola et al.

Patent Number: 5,926,764
Date of Patent: Jul. 20, 1999

[54] METHOD FOR ESTABLISHING A TELECOMMUNICATION CONNECTION

[75] Inventors: Jussi Sarpola, Oulu; Timo Kononen, Tyrnava; Pekka Multanen, Oulu; Pekka Rusi, Isokyro; Aki Suhonen; Markku Vimpari, both of Oulu, all of Finland

[73] Assignee: Nokia Telecommunications Oy, Espoo, Finland

[21] Appl. No.: 08/731,146

[22] Filed: Oct. 10, 1996

[30] Foreign Application Priority Data

Nov. 24, 1995 [FI] Finland ..................................... 955675

[51] Int. Cl.⁶ ........................................ H04Q 7/20
[52] U.S. Cl. ........................ 455/450; 370/337; 370/348
[58] Field of Search .................... 455/450, 464, 455/509, 511; 370/336, 337, 348, 335

[56] References Cited

U.S. PATENT DOCUMENTS 5,633,873  5/1997  Kay et al. ................................ 455/450

FOREIGN PATENT DOCUMENTS

WO 95/15664  6/1995  WIPO .
WO 95/24103  9/1995  WIPO .
WO 96/32824  10/1996  WIPO .

*Primary Examiner*—Andrew M. Dolinar
*Attorney, Agent, or Firm*—Perman & Green, LLP

[57] ABSTRACT

The present invention relates to a method for establishing a telecommunication connection from a subscriber station (1, 9) of a radio system forming a wireless subscriber connection to a public switched telephone network (PSTN), in which method a call request is received from the subscriber station. For achieving a faster and simpler connection establishment than heretofore, a traffic channel is reserved from a data transfer channel (12) leading to the PSTN exchange (7) to be used by the subscriber station (1) that has sent a call request, a connection is established to the PSTN exchange (7), an acknowledgement message is sent to the subscriber station (1), and a speech path is connected between the PSTN exchange (7) and the user interface (2) of the subscriber station, whereby the sound signals fed by the PSTN exchange (7) are transmitted directly on the speech path to the user interface (2) of the subscriber station (1), and the diallings supplied from the user interface (2) of the subscriber station are transmitted to the PSTN exchange (7).

8 Claims, 4 Drawing Sheets

METHOD FOR ESTABLISHING A TELECOMMUNICATION CONNECTION

BACKGROUND OF THE INVENTION

This invention relates to a method for establishing a telecommunication connection from a subscriber station of a radio system forming a wireless subscriber connection to a public switched telephone network (PSTN), in which method a call request is received from the subscriber station. The invention further relates to a radio system forming a wireless subscriber connection, comprising subscriber stations and a subscriber network element comprising means for transmitting data signals between subscriber stations and an exchange of a PSTN network, the system comprising at least one subscriber station comprising means for sending a call request to a subscriber network element by means of radio-frequency signals when the user interface of the subscriber station has shifted into the OFF-HOOK state.

The present invention is related to a WLL system (Wireless Local Loop), that is, to a radio system providing a wireless local loop, in which system the subscriber stations are connected by a radio connection via base stations and a WLL subscriber network element to a PSTN exchange. It is possible to connect to the WLL system any conventional type of user interface, that is, a telephone set, the radio path thus being transparent to the user.

A subscriber station refers herein to the equipment the user has available for transmitting and receiving data signals, i.e. in the case of a WLL subscriber station, the subscriber station comprises a terminal equipment consisting of a radio part and a teleadapter, as well as a user interface to be connected to the terminal equipment, such as a telephone set, telefax, computer-modem combination or the like.

Prior art WLL systems are usually based on some cellular radio system, whereby an exchange of the cellular radio system used as the basis of the system functions as the WLL subscriber network element, with the exception that unnecessary features have been removed from the exchange. The signalling of the WLL system thus corresponds to the cellular radio system on which the WLL system is based as much as possible, and mobile stations of the cellular radio system in question may thus also be used.

A WLL system is previously known in which a signal generator is integrated to a WLL subscriber station for producing sound signals to be fed to the user interface in connection with call setup. In other words, when the user interface shifts into the OFF-HOOK state, the signal generator of the WLL terminal equipment feeds either a busy-tone (if the radio connection is poor), or dialling-tone to the user interface. In this prior art system, once the user has fed the dialling desired by means of his user interface, the subscriber station starts call setup after the duration of six seconds from the last digit that has been dialled. In other words, since the subscriber station cannot analyse the series of digits fed from the user interface, the above-mentioned time supervision of six seconds is necessary for the subscriber station for concluding when the dialling is complete. When the time-supervision of six seconds expires, i.e. the subscriber station has not received any dialling during the last six seconds, the subscriber station sends the dialling it has buffered in form of digit frames to the subscriber network element. The subscriber network element converts the received frames into tone-diallings by means of an MFT converter (Multi-Frequency Tone) and forwards them to the exchange. Once the subscriber network element has sent the diallings to the exchange, it sends an acknowledgement to the subscriber station and connects a speech path between the exchange and the subscriber station.

The most remarkable weakness of the system described above is that the user of the subscriber station does not hear the sound signals sent from the exchange. For instance, in a situation in which the user of the subscriber station has previously programmed a call transfer by means of the user interface of his subscriber station and unintentionally forgotten to cancel the call transfer, a sound signal different from the normal dialling tone is usually transmitted from the PSTN exchange when a new call is being established, the purpose of said sound signal being to indicate to the user that the call transfer is on. Since the sound signals fed by the exchange are not forwarded to the subscriber during call set-up in the above-described WLL system, the user of the subscriber station in question does not hear the sound signal intended for him at any stage.

SUMMARY OF THE INVENTION

The object of this invention is to solve the above-mentioned problem and provide an improved method for call set-up in which all sound signals transmitted by the PSTN exchange are transmitted to the user during call set-up, as well. The object is achieved with a method in accordance with the invention, which is characterized in that a traffic channel is reserved from a data transfer channel leading to the PSTN exchange to be used by the subscriber station that has sent the call request, a connection is established to the PSTN exchange, an acknowledgement message is sent to the subscriber station, and a speech path is connected between the PSTN exchange and the user interface of the subscriber station, whereby the sound signals fed by the PSTN exchange are transmitted directly along the speech path to the user interface of the subscriber station, and the diallings fed from the user interface of the subscriber station are transmitted to the PSTN exchange.

The invention further relates to a radio system in which the method of the invention may be applied. The radio system of the invention is characterized in that the subscriber network element comprises means for reserving a traffic channel from the data transfer channel leading to the PSTN exchange to be used by the subscriber station that has sent the call request, means for sending an acknowledgement message to the subscriber station and for establishing a connection to the PSTN exchange, as well as for connecting a speech path between the PSTN exchange and the subscriber station, whereby the subscriber network element forwards the sound signals fed by the PSTN exchange directly on the speech path to the user interface of the subscriber station, and means for forwarding the diallings fed from the user interface of the subscriber station to the PSTN exchange.

The invention is based on the idea that when the subscriber network element is arranged to establish a connection to the PSTN exchange and to acknowledge a call request received from the subscriber station as soon as possible after receiving the call request so that a speech path is connected between the PSTN network and the subscriber network element almost immediately (practically within a few seconds) after the call request has been received, it can thus be ensured that all the sound signals fed by the PSTN exchange can be heard by the user of the subscriber station, in addition to which the diallings fed by the subscriber subsequent to the sound signal/sound signals may be forwarded as far as to the PSTN exchange to be analysed. The most remarkable advantages of the method and the system of the invention are thus that the user is sure to hear all the sound signals intended for him, the diallings fed by the user need not be analysed in any way in the subscriber network element, and it is thus possible to achieve a simpler structure of the subscriber network element than heretofore, and the time required for call establishment is shortened since it is not necessary to employ time-demanding time supervision functions of any kind and since the call is switched practically almost at the very moment when the user has dialled the last digit. Moreover, since the user hears all the sound signals fed by the PSTN exchange, and all the diallings carried out by the subscriber are transmitted to the PSTN exchange, all the services and functions available in a normal fixed telephone network may be provided to the user in the same way as in the fixed telephone network.

Upon establishing a connection to the exchange of a PSTN network, a subscriber network element first allocates from the data transfer channel between them a traffic channel to be used by the subscriber station that has sent the call request. If the connection between the subscriber network element and the PSTN exchange is an open, V2- or V1.5-type multiplexer connection using the 2 Mbit/s PCM system, a separate time-slot is usually determined for each subscriber from the connection in question, whereby the subscriber network element reserves the time-slot in question for a call outgoing from the subscriber station for avoiding possible collision situations with a terminating call that is (possibly) switched simultaneously by the PSTN exchange.

If, in turn, a V5.2-type connection is in question, it is not necessary to determine a separate time-slot from a PCM connection for every subscriber station as the subscriber stations use the same time-slots by turns. This enables the fact that the number of the subscriber stations may be remarkably larger than the number of traffic channels on the data transfer connection between the subscriber network element and the PSTN exchange. In that case, however, it is not possible to transmit a call simultaneously to all subscribers. When a V5.2.-type connection is concerned, the subscriber network element reserves one of free traffic channels i.e. time-slots to be used by the subscriber station that has sent the call request. Provided that no free traffic channel is to be found, call establishment will fail.

In a preferred embodiment of the invention, the subscriber network element comprises means for transmitting an identifier of at least one free traffic channel of the radio system on the calling channel of the radio system, the subscriber station comprising means for receiving the identifier of the traffic channel mentioned on the calling channel, as well as for transmitting said call request to the subscriber network element by utilizing the traffic channel mentioned on the calling channel when the user interface of the subscriber station shifts into the OFF-HOOK state. Since the subscriber network element reports directly on its calling channel which traffic channels are free at that particular moment, the subscriber station is immediately able to contact the subscriber network element on a free channel. Thus, during call establishment, plenty of time is saved as compared with prior art solutions, in which the subscriber network element reports via its calling channel all the traffic channels it has available regardless of whether there is traffic on the channels concerned or not, whereby the subscriber station must visit the traffic channels one by one and carry out test measurements for finding a free traffic channel.

The preferred embodiments of the invention appear from the appended dependent claims 2 and 4–9.

BRIEF DESCRIPTION OF THE DRAWINGS

In the following, the invention will be described in closer detail by means of a few preferred embodiments of the invention with reference to the attached drawings, in which.

DETAILED DESCRIPTION OF PREFERRED EMBODIMENTS

Figure 1:
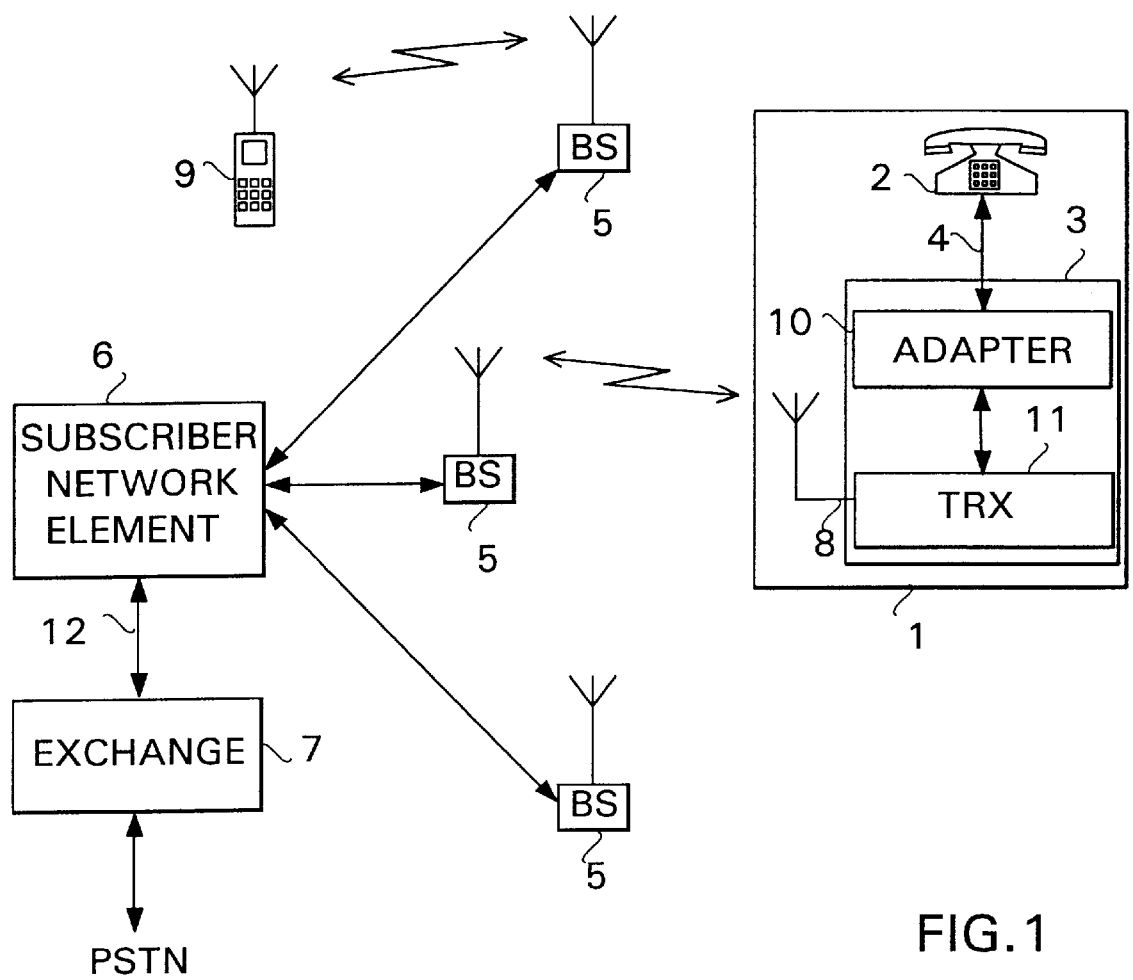
FIG. 1 shows a block diagram of a first preferred embodiment of the system of the invention.

FIG. 1 shows a block diagram of a first preferred embodiment of the radio system of the invention. FIG. 1 shows a part of a WLL system in which the method of the invention may be applied. The WLL system shown in FIG. 1 is based on the NMT-450i system, which has been made simpler by removing unnecessary features. Base stations 5 correspond to parts of the NMT-450i (Nordisk Mobil Telefon) cellular radio system. A subscriber station 1 thus functions in the same way as a normal subscriber station of the NMT 450i system from the point of view of signalling. Via base stations and a subscriber network element 6, it is also possible to transmit calls of a mobile station 9 of the conventional NMT 450i system, provided that the network operator has programmed the subscriber network element 6 with a view to transmitting calls of the telephone in question.

The subscriber station 1 shown in FIG. 1 comprises a telephone 2 and a terminal equipment 3. The telephone 2 shown in FIG. 1 may be a conventional telephone which may be connected to a fixed telephone network and which uses tone-dialling. The telephone 2 and the terminal equipment 3 are connected in FIG. 1 by a double conductor 4, via which signals may be transmitted between the terminal equipment and the telephone. The terminal equipment 3 comprises signal processing means for adapting the speech path to the radio channel. Signal processing means of this kind include e.g. a radio part 11 comprising an antenna 8, a radio transmitter and a radio receiver, as well as a teleadapter 10 for adapting the radio part to a conventional telephone 2.

The subscriber station 1 is connected to a base station 5 (three base stations BS are shown in the figure) via the antenna 8 by means of radio frequency signals, calls being transmitted via said base station to the subscriber network element 6 and further to an exchange 7 of a PSTN network (Public Switched Telephone Network), that is, to an exchange 7 of a fixed telephone network. In the case of FIG. 1, the subscriber network element 6 is connected to a local exchange by means of an open CCITT Q.512 V2-type multiplexer interface employing a 2 Mbit/s PCM (Pulse Code Modulation) system.

The network element 6 shown in FIG. 1 corresponds an MTX exchange of the NMT-450i system to a great extent with the exception that features unnecessary for the operation of the WLL system have been removed, such as the ability to analyse numerical data transmitted from subscriber stations 1 or 9. In accordance with the invention, the dialling in question may be transmitted directly on the speech path from the user interface of the subscriber station to the PSTN exchange 7.

The subscriber network element 6 comprises means for reserving a free traffic channel from a data transfer channel 12 leading to the PSTN exchange 7, whereby the PSTN exchange is no longer able to make an attempt to transmit a terminating call to a subscriber on the same traffic channel. In the case of FIG. 1, the data transfer channel 12 comprises a PCM connection, which may be divided into thirty-two time-slots, for instance, one of the time-slots being used for synchronizing, one for signalling, thirty of them being used as traffic channels.

Figure 2:
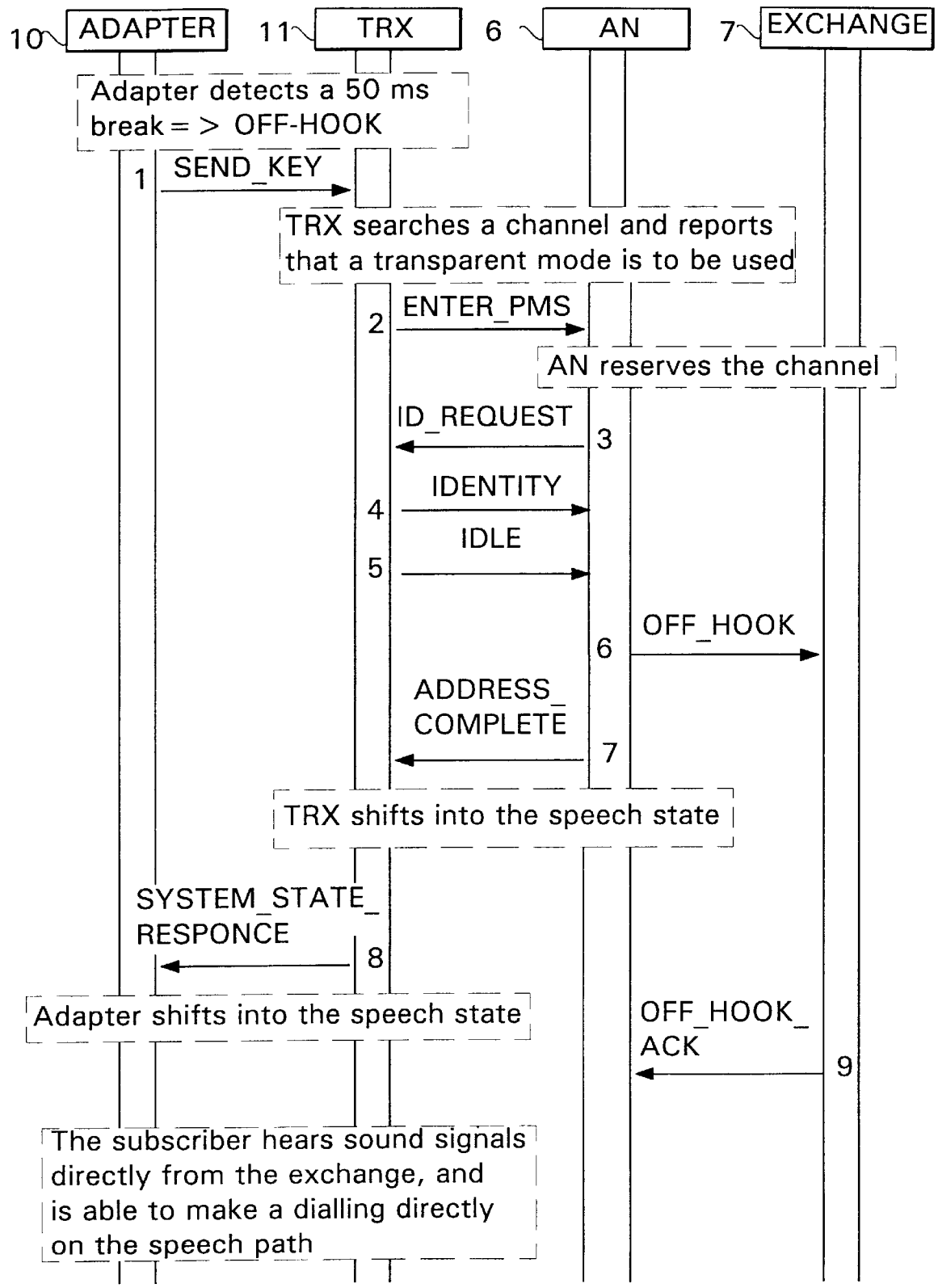
FIG. 2 illustrates a first preferred embodiment of the method of the invention.

FIG. 2 illustrates a first preferred embodiment of the method of the invention. FIG. 2 illustrates signalling between a subscriber station of the WLL system, a subscriber network element, and a PSTN network in a situation where a user of the subscriber station is establishing a call from his subscriber station to the PSTN network. In FIG. 2, ADAPTER refers to the teleadapter 10, TRX refers to the radio part 11 of the terminal equipment, AN refers to the subscriber network element 6, and EXCHANGE refers to the local exchange 7 of the PSTN network.

Once the adapter 10 detects a break of 50 ms in the subscriber interface 2, it sends a message SEND_KEY to the radio part 11. The radio part 11 then checks which channels are transmitted on the calling channel of the WLL system. In other words, identifier frame of the calling channel has been changed in accordance with the invention so that it deviates from the NMT-450i specifications in that respect that instead of channel data band, at least one free channel is mentioned in the frame, whereby the radio part 11 may directly shift onto a free traffic channel of the radio system.

Once the radio part 11 has shifted onto a free traffic channel, it sends a call request to the subscriber network element 6 by using a speech initiation frame ENTER_PMS of a priority subscriber, that is, frame 11b of the NMT-450i specifications. The frame in question indicates to the subscriber network element that it is a question of such a subscriber station that utilizes transparent call establishment in accordance with the invention. Thus, the subscriber network element is able to distinguish e.g. older NMT-450i subscriber stations, which do not allow applying transparent call establishment in accordance with the invention, and WLL subscriber stations that allow applying said call establishment.

When the subscriber network element 6 receives a call request that does not contain a speech initiating frame of a priority subscriber, it establishes a call in a way known as such, e.g. so that the diallings supplied from the user interface are buffered in the terminal equipment by means of time supervision, whereby the terminal equipment assumes a dialling is complete only when no dialling has been entered during the last six seconds, for instance. When time supervision expires, it sends the dialling carried out by the subscriber in form of dialling frames in accordance with the NMT-450i specifications to the subscriber network element, at which they are converted into tone-diallings by means of a MFT converter, whereafter they are forwarded to the PSTN exchange. Only after this, when the diallings have already been sent to the PSTN exchange, does the subscriber network element send an acknowledgement to the subscriber network element, whereby a speech path is connected between the PSTN network and the user interface of the subscriber station.

When the subscriber network element 6, in turn, receives a call in accordance with the invention, containing a speech initiating frame ENTER_PMS of a priority subscriber, it allocates, from a data transfer channel leading to the PSTN exchange, a traffic channel to be used by the subscriber station that has sent the call, whereafter it sends the subscriber network element an ID_REQUEST message 3 and waits until it receives an IDENTITY message 4 and an IDLE message 5 from the subscriber station, whereafter it sends the PSTN exchange an OFF_HOOK message 6 and the subscriber station 1 an ADDRESS_COMPLETE message 7, that is an acknowledgement message which causes the radio part 11 to feed a SYSTEM_STATE_RESPONSE message 8 to the teleadapter 10, as a result of which the terminal equipment 3 shifts into a speech state, and a speech path is thus connected between the user interface 2 and the PSTN exchange 7. Thereafter, the user of the subscriber station 1 will hear all the sound signals fed from the exchange 7 after an OFF_HOOK_ACK message.

Thereafter, when the user hears the sound signal, he may enter his dialling by means of his user interface 2 on the speech path directly via the subscriber network element 6 to the local exchange 7 of the PSTN network.

Figure 3A:
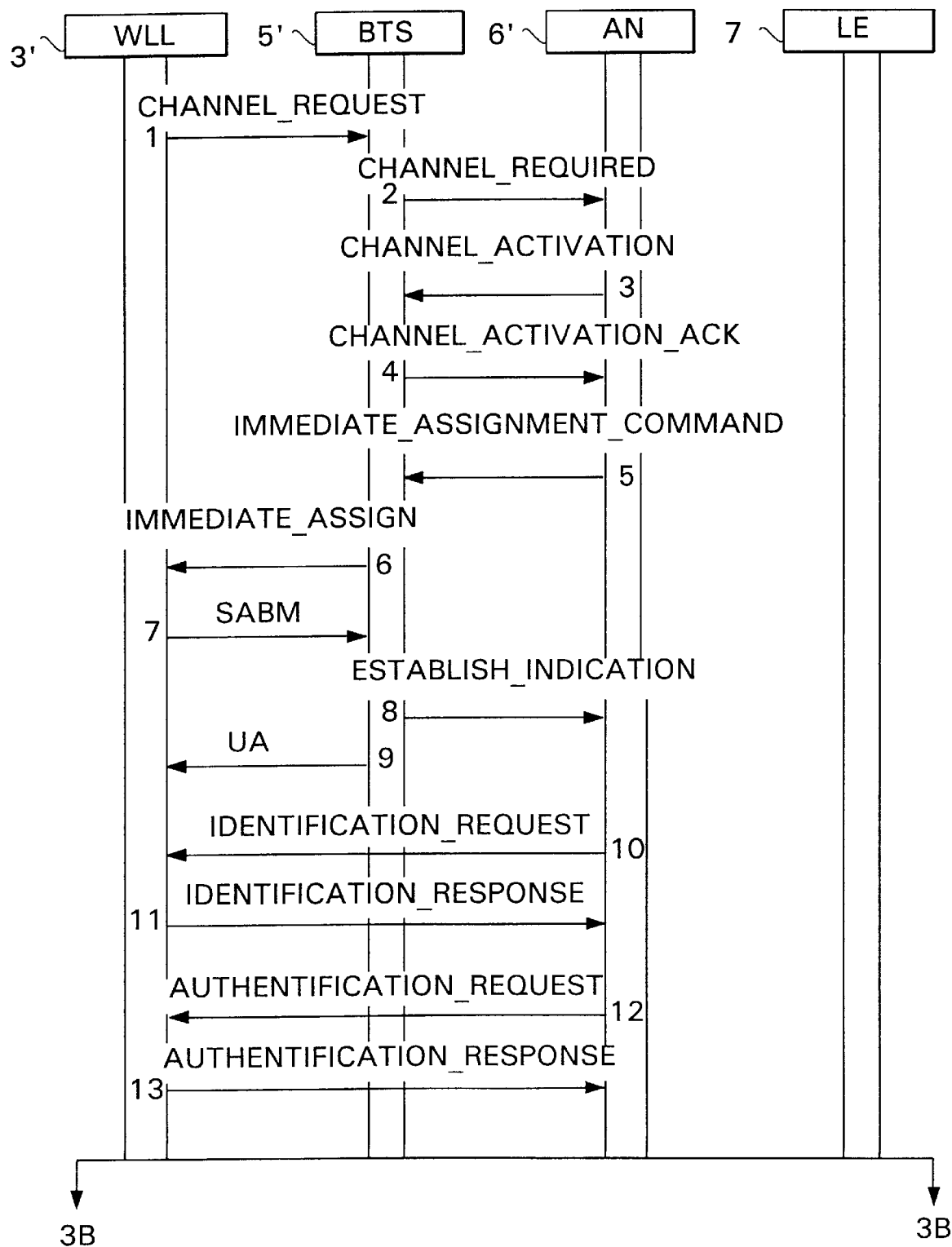
FIGS. 3A and 3B illustrate a second preferred embodiment of the method of the invention.
Figure 3B:
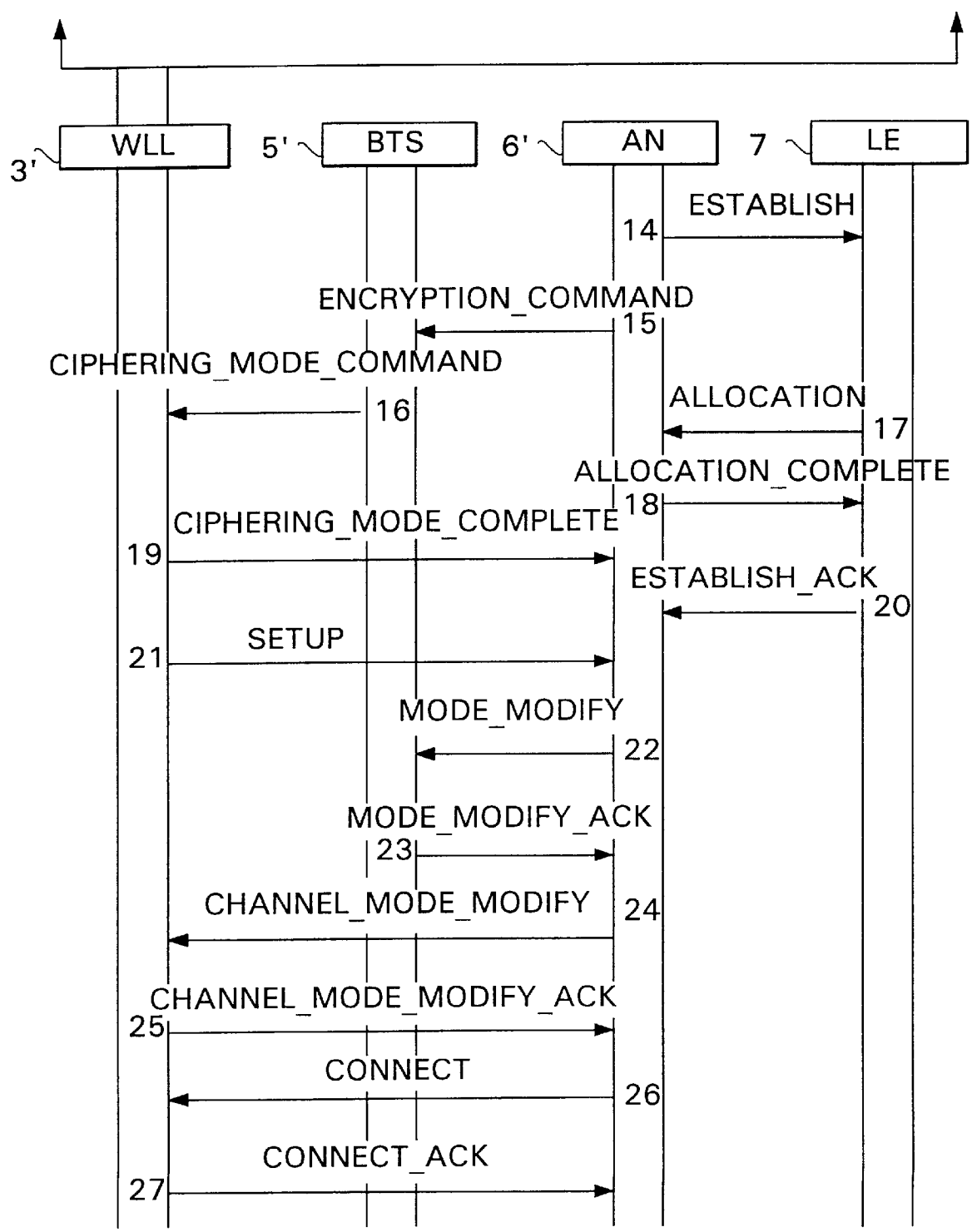

FIGS. 3A and 3B illustrate a second preferred embodiment of the method of the invention. The embodiment shown in FIGS. 3A and 3B differs from the embodiments described previously in such a way that signalling shown in FIGS. 3A and 3B may be applied in a digital WLL system, that is, for instance, in a system based on the GSM mobile communication system (Groupe Spécial Mobile), the DCS 1800 mobile communication system (Digital Cellular System for 1800 MHz), or the like. In the following example, it is supposed it is specifically a question of a WLL system based on the GSM mobile communication system.

In a WLL system based on the GSM system, a call to be established from the subscriber station is preferably established by means of a FACCH (Fast Associated Control CHannel) procedure. Said call establishment technique enables very fast call establishment to the WLL subscriber station. In connection with FACCH call establishment, the subscriber station is shifted from a CCCH to a TCH channel (Traffic CHannel) instead of shifting it to a SDCCH channel (Standalone Dedicated Control CHannel).

FIGS. 3A and 3B illustrate signalling between a subscriber station (WLL) 3', a base station (BTS) 5', a subscriber network element (AN) 6', and a local exchange (LE) 7 in a situation where a subscriber makes a call from the subscriber station 3'. Messages appearing in the figures and their meaning are described in greater detail e.g. in the GSM specifications.

The base station 5' shown in FIGS. 3A and 3B advantageously corresponds to a base station of the GSM system. The subscriber network element 6' corresponds to the mobile services switching centre of the GSM system to a great extent, with the exception that features unnecessary for the operation of the WLL system in accordance with the invention have been removed from it, such as analysing the diallings fed by the user, and a handover of an ongoing call. Accordingly, as in connection with FIGS. 1 and 2, it is also possible in connection with this embodiment to use mobile stations of the mobile communication system that has been used as the basis of the WLL system.

When the user interface of the subscriber station 3' shifts into the off-hook state, the terminal equipment sends a call request to the base station 5' by means of a CHANNEL_REQUEST message using an RACH channel (Random Access CHannel). The base station 5' transmits the channel request to the subscriber network element 6' with a CHANNEL_REQUIRED message 2, whereby the subscriber network element starts to allocate a traffic channel to the subscriber station. Once the traffic channel TCH has been allocated for the subscriber station, the subscriber network element activates the channel by sending a CHANNEL_ACTIVATION message 3 to the base station. The base station acknowledges activation of the channel to the subscriber network element with a message CHANNEL_ACTIVATION_ACK message 4.

When the traffic channel is activated, the subscriber network element sends an IMMEDIATE_ASSIGNMENT_COMMAND message 5 to the base station, which, in turn, forwards an IMMEDIATE_ASSIGNMENT message 6 included in said message further to the subscriber station 3' along the radio path. After receiving said message, the subscriber station shifts onto the traffic channel TCH reserved for it, whereafter it sends a service request message SABM (7) to the base station 5'. The base station forwards the service request message to the subscriber network element 6' with an ESTABLISH_INDICATION message 8, which contains the identifier of the subscriber station, TMSI (Temporary Mobile Subscriber Identity). The subscriber network element 6' acknowledges the service request message to the subscriber station 3' by sending it a UA message 9.

If the VLR (Visitors Location Register) of the subscriber network element does not identify the identifier TMSI of the subscriber station 3', it sends the subscriber station an IDENTIFICATION_REQUEST message 10, by means of which it requests the subscriber station to report its IMSI identifier (International Mobile Subscriber Identity), to which the subscriber station 3' responds with an IDENTIFICATION_RESPONSE message 11.

Once the subscriber station has been identified, the subscriber network element 6' starts authentification by sending the subscriber station an AUTHENTIFICATION_REQUEST message 12. The subscriber station 3' responds to said message with an AUTHENTIFICATION_RESPONSE message 13. After said message has been received and the content has been checked, the subscriber network element starts establishing a connection to a local exchange of the PSTN network by sending an off-hook message to the local exchange 7 by means of an ESTABLISH message 14, and an ENCRYPTION_COMMAND message 15 to the base station. The base station 5' analyses the message, and, provided that a ciphering function is required, it activates its demodulator and sends the subscriber station a CIPHERING_MODE_COMMAND message 16. Said message is sent to the subscriber station in all cases, but only under certain conditions does it contain a command by means of which the subscriber station 3' activates the ciphering function.

The PSTN exchange 7 sends the subscriber network element 6' an ALLOCATION message 17, which contains the time-slot allocated to be used by said subscriber from the PCM connection between the PSTN exchange and the subscriber network element. The subscriber network element acknowledges the message by sending the PSTN exchange an ALLOCATION_COMPLETE message 18.

When the subscriber station 3' has activated the ciphering function (if necessary), it sends the subscriber network element a CIPHERING_MODE_COMPLETE message 19. When the subscriber network element then receives an ESTABLISH_ACK message 20 from the PSTN exchange, it connects a speech path between the subscriber station and the exchange, whereafter all the sound signals fed from the exchange are transmitted to the subscriber station.

The subscriber station initiates call establishment with a SETUP message 21. If a WLL subscriber station utilizing transparent call establishment in accordance with the invention is concerned, a predetermined number is contained by the SETUP message. The number actually does not exist (dummy number), but it indicates to the subscriber network element it is a question of a subscriber station that is capable of transparent call establishment. The subscriber network element 6' thus sends the base station a MODE_MODIFY message 22 for adjusting the state of the base station to transparent call establishment. The base station acknowledges the message with a MODE_MODIFY_ACK message 23. Thereafter, the subscriber network element sends the subscriber station a CHANNEL_MODE_MODIFY message 24, which causes the subscriber station to shift from the signalling state into the speech state. The subscriber station acknowledges this by sending the subscriber network element a CHANNEL_MODE_MODIFY_ACK message 25.

By means of a CONNECT message 26 the subscriber network element 6' requests the subscriber station to connect a speech path to the user interface, whereafter the user can hear all the sound signals transmitted from the PSTN exchange on the speech path. The subscriber station acknowledges the CONNECT message with a CONNECT_ACK message 27. Thereafter, the subscriber may start feeding the diallings. All diallings are transmitted one by one from the subscriber station 3' to the PSTN exchange 7, where the dialling is analysed.

The diallings may be transmitted to the subscriber network element by means of signalling, e.g. by sending each digit supplied to the subscriber network element 6' e.g. by means of a single message, e.g. a START_DTMF message in accordance with the GSM system, whereby the subscriber network element identifies the digit included in each message and forwards it to the local exchange 7 e.g. in form of a tone-dialling via a PCM connection. In such a case, the subscriber network element 6' advantageously comprises a DTMF converter (Dual Tone Multi-Frequency) for generating tone-diallings.

The digit analysis system of a fixed telephone exchange may add, if necessary, an area code used in the geographic area covered by the WLL system ahead of such diallings transmitted from the WLL subscriber stations that have previously contained no area code.

Alternatively, if the subscriber has a conventional fixed telephone utilizing tone-dialling, it is possible to transmit the diallings directly to the exchange along the speech path without a need to convert them at any stage. This requires, however, that the WLL terminal equipment 3' comprises such a codec by means of which it is possible to transmit the diallings to the PSTN exchange so that their quality still remains sufficient. An appropriate codec for this purpose is e.g. an EFR codec (Enhanced Full Rate) manufactured by NOKIA.

It should be understood that the above explanation and the drawings associated therewith are only intended to illustrate the present invention. Different variations and modifications will be obvious to persons skilled in the art without deviating from the scope and the spirit of the invention set forth in the attached claims. The method and the system of the invention is thus not limited to WLL systems based on a mobile communication system, but it may also be applied in connection with other WLL systems.

We claim:

1. A method for establishing a telecommunication connection from a subscriber station of a radio system forming a wireless subscriber connection to a public switched telephone network (PSTN), said method comprising the steps of:

transmitting an identifier of at least one free traffic channel of the radio system on a calling channel of the radio system, providing a subscriber station with means for receiving the identifier of the traffic channel transmitted on the calling channel, and with means for transmitting a call request to a subscriber network element by utilizing the traffic channel mentioned on the calling channel when a user interface of the subscriber station shifts into an OFF-HOOK state, reserving a traffic channel from a data transfer channel leading to a PSTN exchange to be used by the subscriber station that has sent the call request, establishing a connection to the PSTN exchange, sending an acknowledgement message to the subscriber station, and connecting a speech path between the PSTN exchange and the user interface of the subscriber station, whereby sound signals fed by the PSTN exchange are transmitted directly along the speech path to the user interface of the subscriber station, and transmitting dialings fed from the user interface of the subscriber station to the PSTN exchange.

2. A method as claimed in claim 1, wherein the diallings fed from the user interface of the subscriber station are transmitted to the PSTN exchange along the speech path.

3. A radio system forming a wireless subscriber connection comprising subscriber stations and a subscriber network element comprising means for transmitting data signals between the subscriber stations and a PSTN exchange and means for transmitting an identifier of at least one free traffic channel of the radio system on a calling channel of the radio system, whereby the system comprises at least one subscriber station comprising means for receiving the identifier of the traffic channel transmitted on the calling channel, and means for transmitting a call request to the subscriber network element on the traffic channel mentioned on the calling channel by means of radio frequency signals, when a user interface of the subscriber station has shifted into an OFF-HOOK state, and said subscriber network element further comprises:

means for reserving a traffic channel from a data transfer channel leading to the PSTN exchange to be used by the subscriber station that has sent the call request, means for sending an acknowledgement message to the subscriber station and for establishing a connection to the PSTN exchange as well as for connecting a speech path between the PSTN exchange and the subscriber station, whereby the subscriber network element forwards sound signals fed by the PSTN exchange directly on the speech path to the user interface of the subscriber station, and means for forwarding dialings fed from the user interface of the subscriber station to the PSTN exchange.

4. A radio system as claimed in claim 3, wherein the subscriber station comprises means for transmitting data signals received from the subscriber network element on the speech path to the user interface after receiving a predetermined message, whereby all the sound signals supplied by the PSTN exchange are transmitted to the user interface of the subscriber station.

5. A radio system as claimed in claim 3, wherein the subscriber network element is connected to the exchange of a PSTN network by means of a V2-, V5.1- or a V5.2-type open multiplexer interface using a 2 Mbit/s PCM system.

6. A radio system as claimed in claim 3, wherein the signalling between the subscriber stations and the subscriber network element substantially corresponds to signalling defined in the NMT-450i specifications, whereby at least one of the subscriber stations (1) is arranged to use an ENTER__PMS frame defined in the NMT-450i specifications as the call request, and the subscriber network element is arranged to use an ADDRESS__COMPLETE frame as the predetermined acknowledgement message.

7. A radio system as claimed in claim 3, wherein the signalling between the subscriber stations and the subscriber network element substantially corresponds to signalling defined in the GSM specifications, whereby at least one of the subscriber stations is arranged to use a SETUP message defined in the GSM specifications as the call request, said message containing a predetermined telephone number, and that the subscriber network element is arranged to use a CONNECT message as the predetermined acknowledgement message to be sent to the subscriber station.

8. A radio system as claimed in claim 3, wherein the dialings supplied from the user interface are tone-dial digits, which are transmitted directly to the PSTN exchange along the speech path.

* * * * *